(12) United States Patent
King, IV

(10) Patent No.: US 8,465,053 B2
(45) Date of Patent: Jun. 18, 2013

(54) PROTECTIVE SHIELD

(76) Inventor: Grady King, IV, Washington, DC (US)

(*) Notice: Subject to any disclaimer, the term of this patent is extended or adjusted under 35 U.S.C. 154(b) by 0 days.

(21) Appl. No.: 13/409,539

(22) Filed: Mar. 1, 2012

(65) Prior Publication Data
US 2012/0223513 A1   Sep. 6, 2012

Related U.S. Application Data

(60) Provisional application No. 61/457,334, filed on Mar. 2, 2011, provisional application No. 61/457,337, filed on Mar. 3, 2011.

(51) Int. Cl.
*B60J 11/00* (2006.01)
*B60R 19/54* (2006.01)
*B60K 37/00* (2006.01)

(52) U.S. Cl.
USPC ............................ 280/770; 280/762; 296/207

(58) Field of Classification Search
USPC ................ 293/128, 126, 127; 296/95.1, 97.5, 296/97.7, 97.8, 207; 160/370.21; 280/770
See application file for complete search history.

(56) References Cited

U.S. PATENT DOCUMENTS

| | | | |
|---|---|---|---|
| 4,811,982 A | 3/1989 | Carlyle | |
| 4,945,935 A | 8/1990 | Su | |
| 5,050,925 A | 9/1991 | Brown | |
| 5,072,979 A * | 12/1991 | Swinton | 293/128 |
| 5,184,857 A * | 2/1993 | Hawkins | 293/128 |
| 5,971,451 A | 10/1999 | Huang | |
| 6,113,142 A * | 9/2000 | Tolbert | 280/770 |
| 6,406,080 B1 | 6/2002 | Davis | |
| 6,769,725 B2 * | 8/2004 | Ko | 293/128 |
| 2007/0000532 A1 * | 1/2007 | Varjabedian | 135/88.01 |
| 2007/0166101 A1 | 7/2007 | Scheu | |
| 2010/0109308 A1 * | 5/2010 | Gordon | 280/770 |

OTHER PUBLICATIONS

EuroBumperGuard; Bumper Protection; www.eurobumperguard.com/bumper_pad.html; 8 pages.
Carbumper.com; www.carbumper.com; 2 pages.
International Search Report dated Sep. 28, 2012.

* cited by examiner

*Primary Examiner* — John Walters
*Assistant Examiner* — James Triggs
(74) *Attorney, Agent, or Firm* — KED & Associates LLP

(57) ABSTRACT

A protective shield for a vehicle is provided. The protective shield may include a plurality of shield panels configured to shield particular areas of a vehicle from damage, and a connecting member that connects the shield panels. The shield panels may be adjustable along a length of the connecting member. The shield panels may each include a planar main body, and at least one opening that extends through the planar main body, configured to receive the connecting member threaded therethrough. At least one magnet may be embedded in the planar main body of the panel shield, configured to magnetically adhere the shield panel to the vehicle. A clasp member may be disposed at each end of the connecting member. The connecting member may extend through each shield panel at least twice.

19 Claims, 9 Drawing Sheets

PROTECTIVE SHIELD

CROSS-REFERENCE TO RELATED APPLICATION(S)

This application claims priority to U.S. Provisional Application Nos. 61/457,334 and 61/457,337 filed on Mar. 2, 2011 and Mar. 3, 2011, respectively, whose entire disclosures are hereby incorporated by reference.

BACKGROUND

1. Field

A protective shield for a vehicle is disclosed herein.

2. Background

Protective shields for vehicles are known. However, they suffer from various disadvantages.

BRIEF DESCRIPTION OF THE DRAWINGS

Embodiments will be described in detail with reference to the following drawings in which like reference numerals refer to like elements, and wherein.

DETAILED DESCRIPTION

A protective shield according to embodiments disclosed herein may protect a vehicle from, for example, scratches and dents in the paint, and to a certain extent the body of the vehicle, which may occur in, for example, public or private parking garages and lots. The dimensions of standard parking spaces generally range from, for example, approximately 7.9 feet to approximately 9 feet in width making them suitable for certain vehicles, such as compact, mid-size, and luxury cars, and SUVs. An open vehicle door may add a span of, for example, approximately 31 inches to approximately 35½ inches to a width of the vehicle running the risk of touching a vehicle parked in an adjacent space. The protective shield according to embodiments disclosed herein may offer a simple, yet efficient way to protect vehicles from scratches and dents that may occur in, for example, public or private parking garages and lots.

The protective shield according to embodiments disclosed herein may come in various sizes, for example, sizes for vehicles ranging from compact to mid-size to large SUVs and may be used while a vehicle is in a parked mode.

Figure 1A:
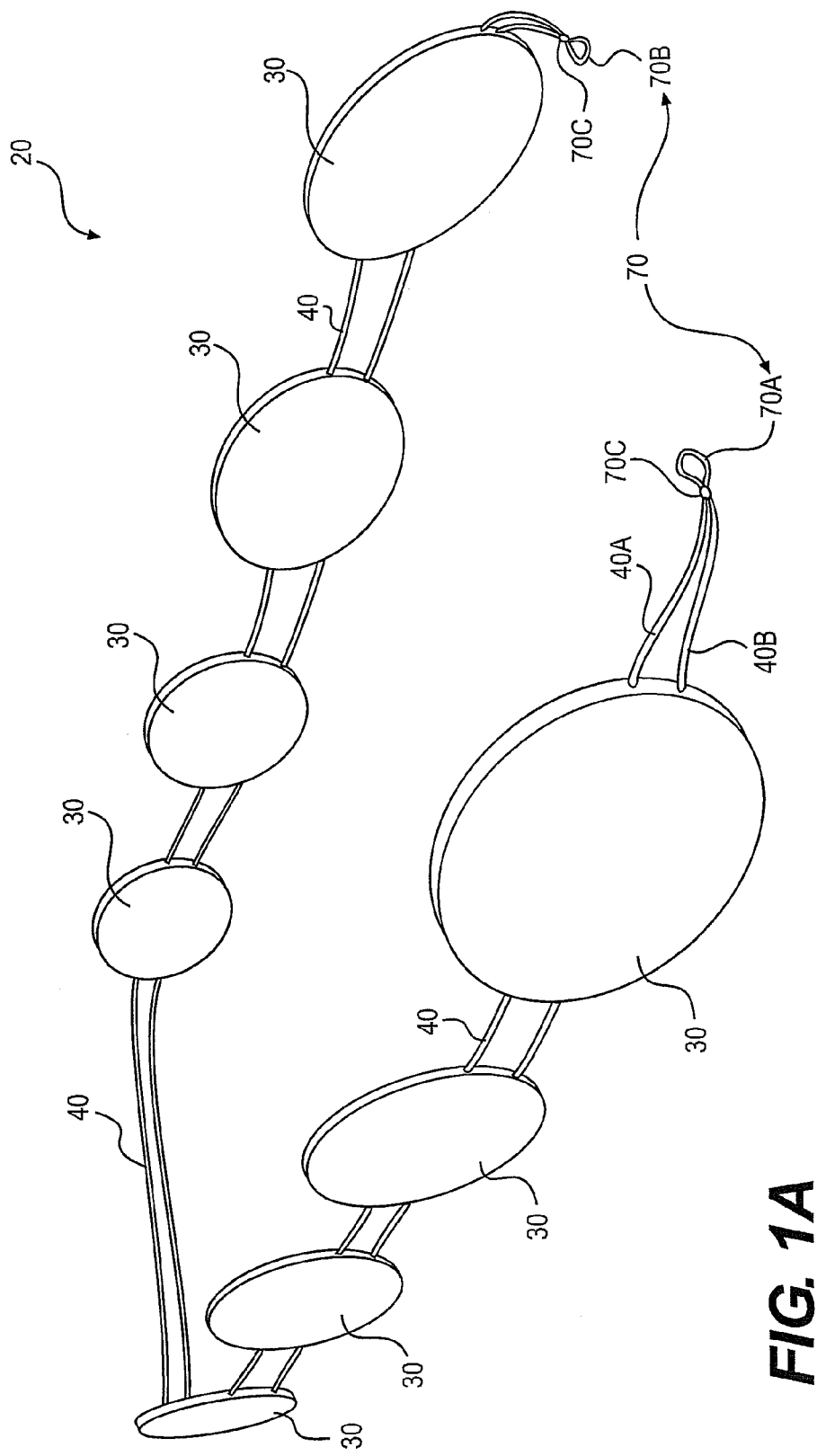
FIG. 1A is a perspective view of a protective shield for a vehicle according to an embodiment.
Figure 1B:
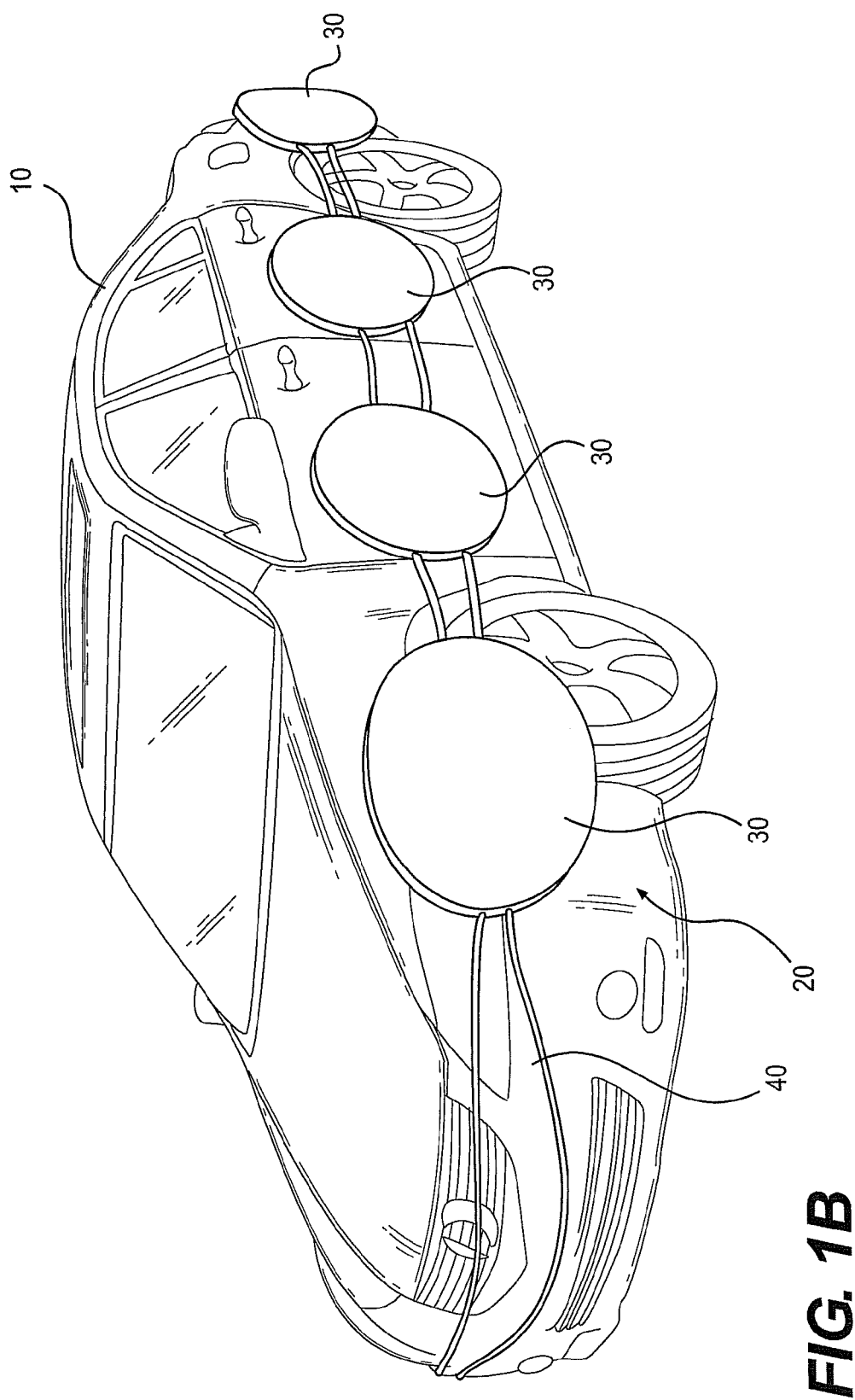
FIG. 1B is a perspective view of a protective shield for a vehicle according to an embodiment, shown on a vehicle.
Figure 2:
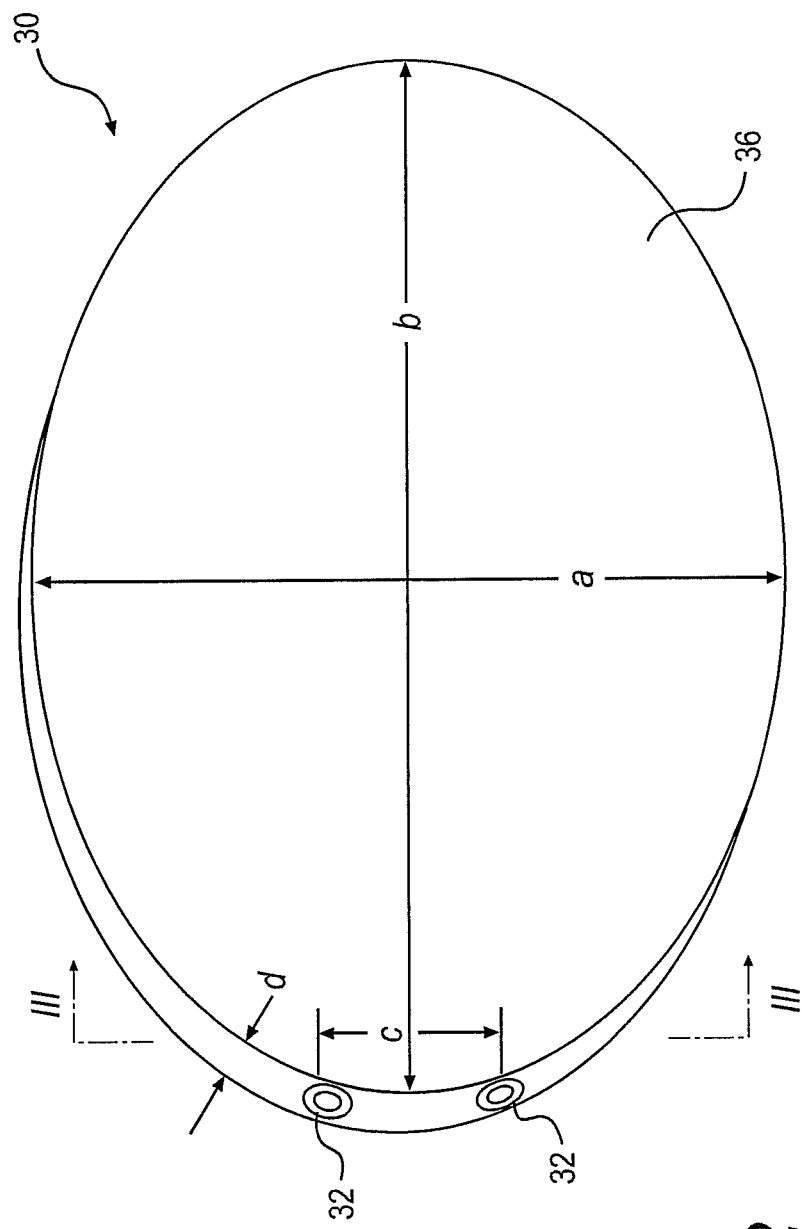
FIG. 2 is a perspective view of a shield panel of the protective shield of FIG. 1.
Figure 3:
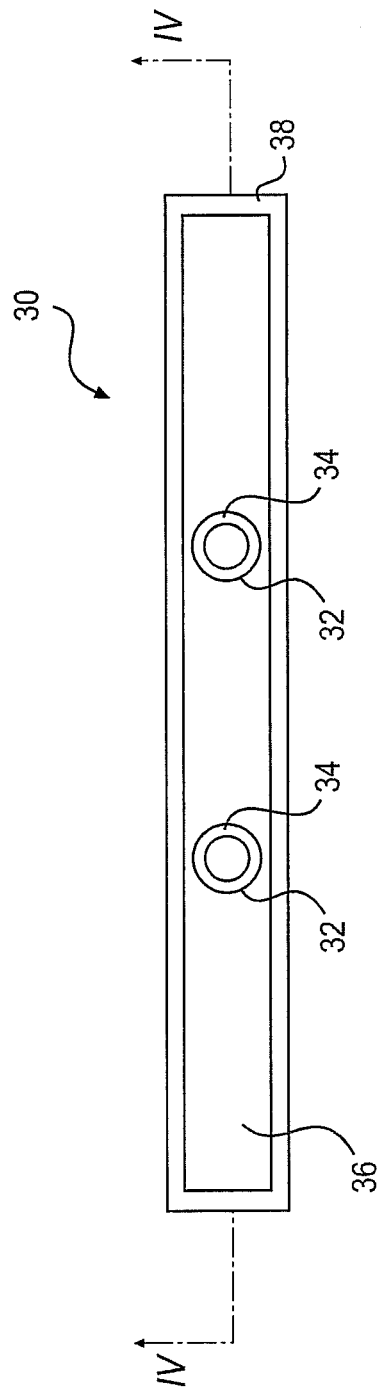
FIG. 3 is a cross-sectional view, taken along line III-III of FIG. 2.
Figure 4:
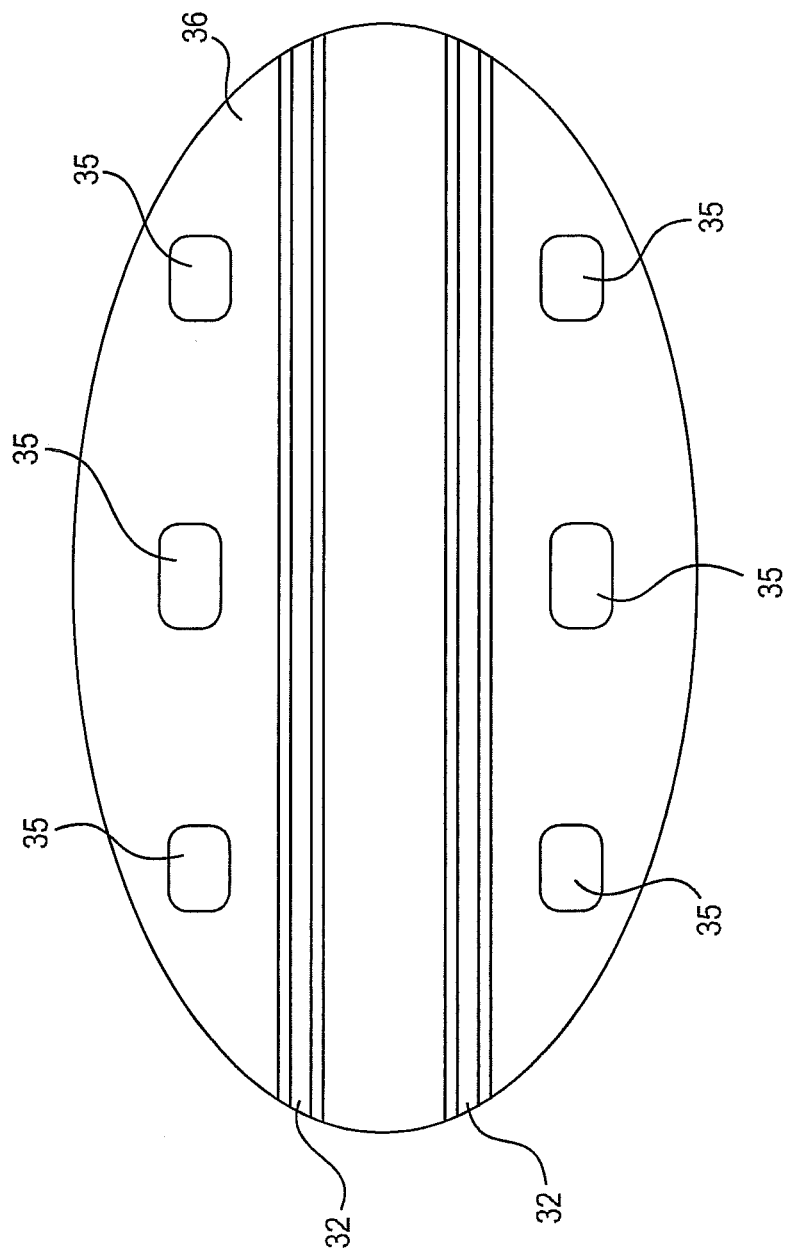
FIG. 4 is a cross-sectional view, taken along line IV-IV of FIG. 3.
Figure 5:
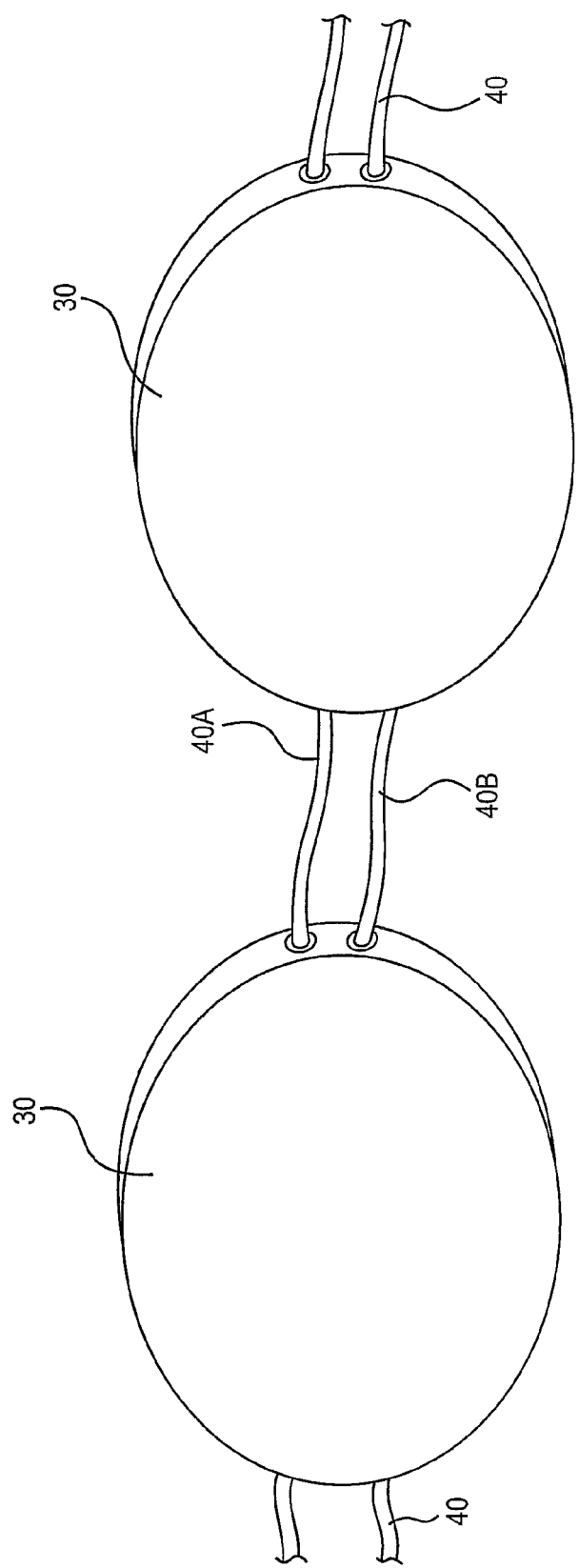
FIG. 5 is a perspective view of two of the shield panels of the protective shield of FIG. 1.
Figure 6:
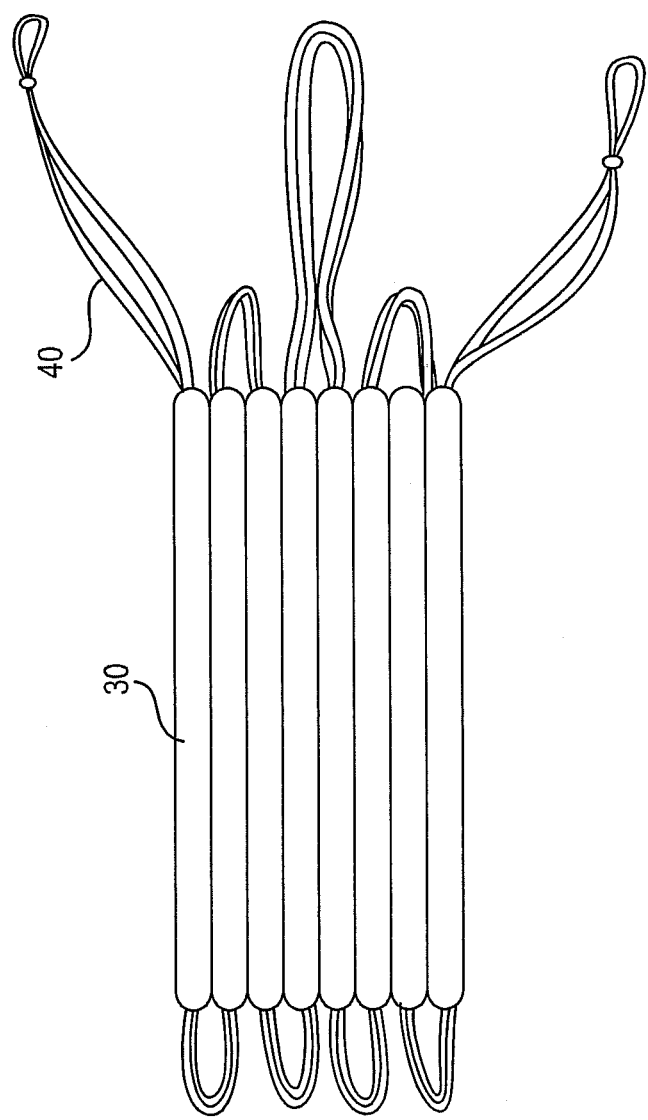
FIG. 6 is a side view of the protective shield of FIG. 1 "folded-up" for storage.
Figure 7A:
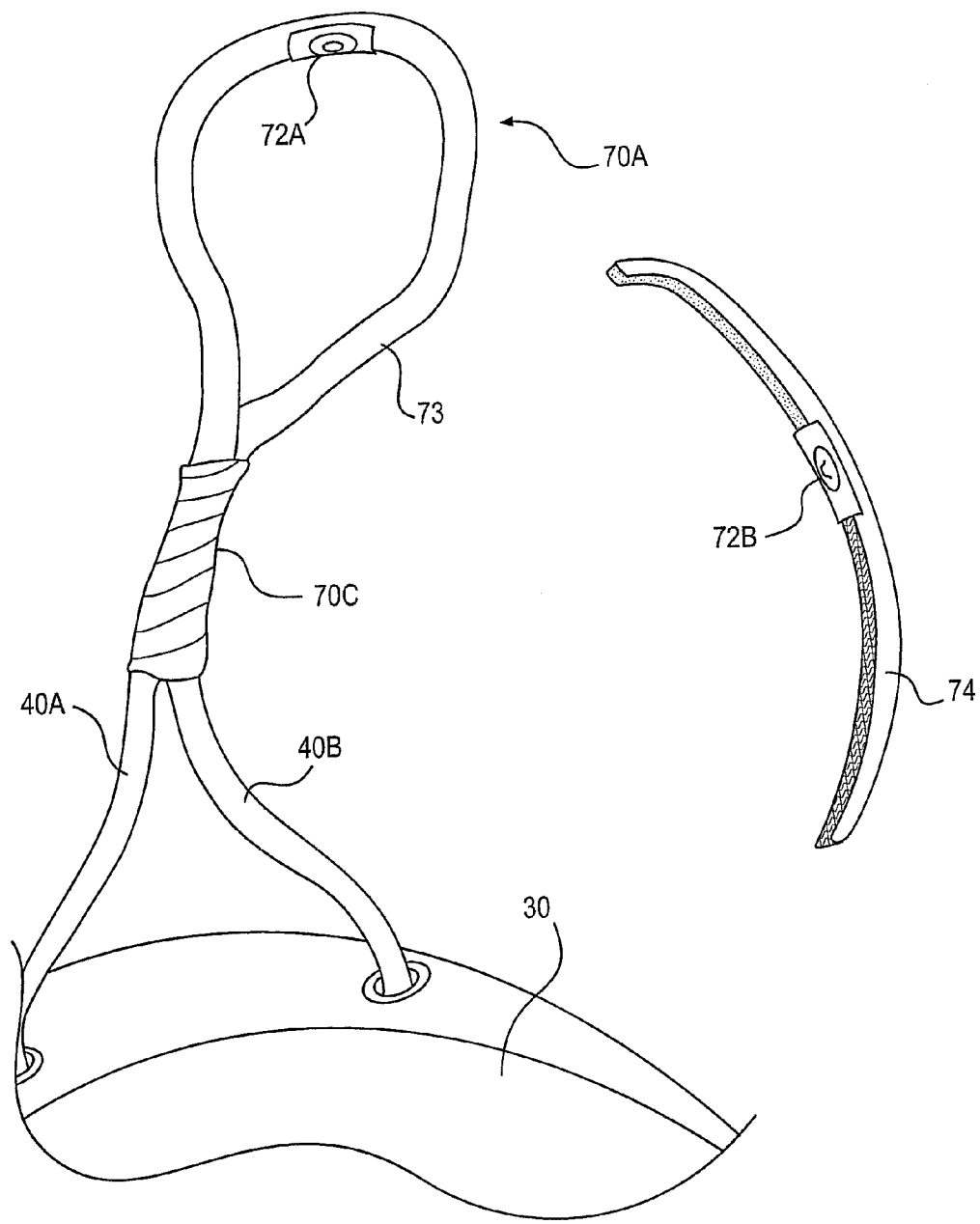
FIGS. 7A-7B are perspective views of a clasp member according to embodiments.
Figure 7B:
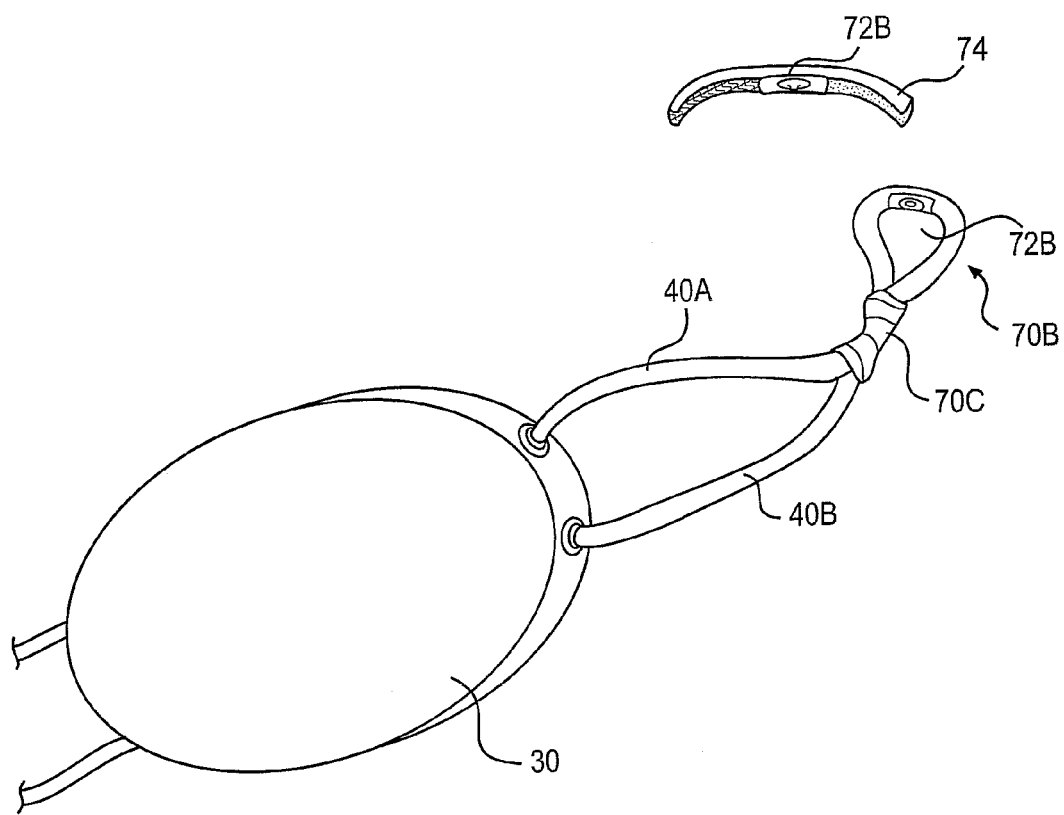

FIG. 1A is a perspective view of a protective shield for a vehicle according to an embodiment. FIG. 1B is a perspective of a protective shield for a vehicle according to an embodiment, shown on a vehicle. FIG. 2 is a perspective view of a shield panel of the protective shield of FIG. 1. FIG. 3 is a cross-sectional view, taken along line III-III of FIG. 2. FIG. 4 is a cross-sectional view, taken along line IV-IV of FIG. 3. FIG. 5 is a perspective view of two of the shield panels of the protective shield of FIG. 1. FIG. 6 is a side view of the protective shield of FIG. 1 "folded-up" for storage. FIGS. 7-7B are perspective views of a clasp member according to embodiments.

The protective shield 20 of FIGS. 1A-1B may include a plurality of shield panels 30 and a connecting member 40 that connects the plurality of shield panels 30. The plurality of shield panels 30 may be configured to be adjustable along a length of the connecting member 40 to allow for positioning of the shield panels 30 adjacent areas of a vehicle 10 a user desires to protect.

A size of the shield panels 30 may vary based on, for example, a size of the vehicle. Further, the number of shield panels 30 may vary based on, for example, a size of the vehicle. For example, the protective shield may include 6 or 8 shield panels based on the size of the vehicle. Furthermore, the length of the connecting member 40 may vary based on, for example, a size of the vehicle. Additionally, as will be described hereinbelow, additional shield panels 30 may be added to or removed from the connecting member 40, either during manufacture or thereafter, to achieve a desired size.

Each of the plurality of shield panels 30 may include a substantially planar main body 36. The planar main body 36 may be oval in shape, as shown in FIG. 2; however, other shapes may also be appropriate based on the application. The planar main body 36 may be made of a foam material or other flexible material. The material may be an all-weather or weather resistant type material. For example, the planar main body may be made of a high-density, low thickness foam material that is flexible, but strong so as to provide protection against impact. One example of such a material is Poly Lam 1.7 PCF. The ability of the plurality of shield panels 30 to be adjusted along the length of the connecting member 40, in combination with the flexibility of the individual shield panels 30 allows an individual to selectively protect desired portions or areas of a vehicle.

The planar main body 36 may be encased in a covering 38, as shown in FIG. 3. The covering 38 may be formed of a thin, flexible material. Further, the covering 38 may be formed of an all-weather or weather resistant material. For example, the covering may be made of polyester, nylon, a nylon blend, such as a nylon-lycra blend, or polyurethane, treated so as to be all-weather or weather resistant. For example, the covering may be a 100% nylon fabric covering, treated to be water-repellant. Furthermore, the covering 38 may be configured to have indicia and/or images disposed thereon, such as advertisements, sports team logos, company logos, school logos, or similar images and/or indicia. For example, the panel covering may be personalized and feature, for example, advertisements, company logos (i.e. Nike, Underarmour, etc.), university team logos (i.e., Virginia Tech Hokies, Maryland Terrapins, Howard University Bisons, etc.), and/or professional team logos (of the NFL, NBA, MLB, FIFA etc.). Alternatively, the covering 38 may be formed integral with the planar main body 32. The covering may also be just one color with, for example, a logo for the Protection Shield.

The shield panel 30 may be, for example, approximately 15 inches in longitudinal height (a), approximately 20 inches in lateral width (b), and approximately 1 inch in depth (d); however, other dimensions may also be appropriate based on the application.

One or more openings 32 may extend through the planar main body 36 from one side to the other. The one or more openings 32 may be configured to receive the connecting member 40 threaded therethrough. FIG. 2 shows two openings 32; however, embodiments are not so limited and another number of openings may be appropriate. Where two openings 32 are provided, they may be spaced apart by approximately five inches.

As shown in FIG. 3, reinforcing tubing 34 may be provided in each opening 32. The reinforcing tubing 34 may function to add strength to the shield panel 30, prevent internal damage to the shield panel 30, and in particular, the opening 32, and allow the connecting member 40 to more easily slide within the opening 32 for adjustment purposes. The reinforcing tubing 34 may extend along only a portion of the opening 32. Fox example, the reinforcing tubing 34 may be, for example, approximately 2 inches in length and approximately 1.5 inch in diameter; however, other dimensions may also be appropriate based on the application. Alternatively, the reinforcing tubing 34 may extend the entire length of the opening 32, that is, the entire lateral length of the shield panel 30. The reinforcing tubing 34 may be made of clear plastic tubing, for example.

FIG. 4 is a cross-sectional view, taken along line IV-IV of FIG. 3. As shown in FIG. 4, one or more magnets may be embedded in the shield panel 30. The one or more magnets 35 allow the shield panel 30 to adhere to a desired position on a vehicle. The one or more magnets 35 may be, for example, approximately 3.5 by 2 inch magnets. A strength of the one or more magnets 35 may be sufficient to adhere the shield panel 30 to a desired position on a vehicle, and may vary based on, for example, the application and/or materials utilized.

The connector member 40 may be threaded through each of the plurality of shield panels 30, such that the shield panels 30 are adjustable along a length of the connector member 40. The connector member 40 may be, for example, a cord or a rope. The connector member 40 may be, for example, an all-purpose polyester braided cord. The connector member 40 may be made of an all-weather or weather resistant type material.

The connecting member 40 may be formed of two connecting members 40A, 40B threaded through each shield panel 30. At ends thereof, the connecting members 40A, 40B may be joined or fused together at portion 70C.

A clasp member 70 may be provided to allow the protective shield to be secured into place on a vehicle. For example, the clasp member may include a clasp element 70A, 70B provided at each end of connecting member 40. The clasp elements 70A, 70B may be configured to be secured to one another or to portions of the vehicle 10. Each clasp element 70A, 70B may include a loop 73 formed at an end of the connecting member 40, 40A, 40B. The loop 73 may be created when the connecting members 40A, 40B are joined or fused together. The loop 73 may be used to secure the protective shield 20 to the vehicle 10 or to the other end of the connecting member 40, 40A, 40B. For example, the loop may be secured to or on a hook element, such as a clothing hook, within the vehicle. Alternatively, a snap 72A or other fixing device may be provided to secure the respective end of the connecting member 40, 40A, 40B to the other end of the connecting member 40, 40A, 40B via a mating snap 72B or other fixing device provided thereon or to a mating snap 72B or other fixing device provided on a Velcro (hook and eye) strip or other similar type strip. For example, a snap 72A or other fixing device may be provided on the loop 73. A Velcro (hook and eye) strip having a mating snap 72B may be provided. The Velcro strip 74 may be secured to the loop 73 via the mating snaps 72A, 72B, and then the Velcro strip 74 may be looped around an element within the vehicle, such as the steering wheel, and secured to itself using the Velcro.

When not in use, the plurality of shield panels 30 may be conveniently folded up or stacked for storage, as shown in FIG. 7. For example, the protective shield may be stored in the trunk of the vehicle when not in use.

To set up or arrange the protective shield on a vehicle, a user may secure a first end of the protective shield to any anchored spot outside or inside the vehicle (i.e., steering wheel, door handle, break pedal, trunk latch) and start walking around the car unfolding the shield panels one by one and placing them strategically where protection is needed most. After going around the vehicle, a second end of the protective shield may be attached, for example, to the first end or to a portion of the vehicle adjacent to which the first end is attached. Shutting the door or trunk may lock everything into place and keep the connecting member taught and all the shield panels secure and in place. At this point, the shield panels may still be somewhat adjusted for even more precise protection and a more customized fit.

In most cases the average cost of repairing a dent and scratch may not be worth the insurance deductible and may end up being an out of pocket expense that can add up. The protective shield may therefore be a valuable investment.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A protective shield for a vehicle, the protective shield comprising:
   a plurality of shield panels configured to shield particular areas around a periphery of a vehicle from damage; and
   a connecting member that connects the plurality of shield panels, wherein the plurality of shield panels are individually adjustable along a length of the connecting member, such that the plurality of shield panels are movable along the length of the connecting member to shield the particular areas anywhere along the periphery of the vehicle.

2. The protective shield of claim 1, wherein the plurality of shield panels each comprises:
   a substantially planar main body; and
   at least one opening that extends through the planar main body, configured to receive the connecting member threaded therethrough.

3. The protective shield of claim 2, further comprising at least one tubular member that extends along at least a portion of the at least one opening.

4. The protective shield of claim 2, wherein at least one magnet is embedded in the planar main body of the shield panel, configured to magnetically adhere the respective shield panel to the vehicle.

5. The protective shield of claim 2, wherein the planar main body is oval in shape.

6. The protective shield of claim 2, wherein the planar main body has a thickness of approximately 1 inch.

7. The protective shield of claim 2, wherein the planar main body is formed of a flexible material.

8. The protective shield of claim 2, wherein the planar main body is formed of a weather resistant material.

9. The protective shield of claim 2, wherein the planar main body is formed of a foam material.

10. The protective shield of claim 2, wherein the planar main body is encased in a covering.

11. The protective shield of claim 10, wherein the covering is formed of a weather resistant material.

12. The protective shield of claim 1, further comprising a clasp member disposed at each end of the connecting member and configured to secure the plurality of shield panels onto the vehicle.

13. The protective shield of claim 12, wherein the clasp member comprises a loop provided at each end of the connecting member.

14. The protective shield of claim 13, wherein the clasp member includes a snap provided on the loop and a mating snap provided on a Velcro strip.

15. The protective shield of claim 1, wherein the connecting member comprises a cord or rope.

16. The protective shield of claim 1, wherein the connecting member extends through each of the plurality of shield panels at least once.

17. The protective shield of claim 16, wherein the connecting member extends through each of the shield panels in a direction extending parallel to a central longitudinal axis thereof.

18. The protective shield of claim 16, wherein the connecting member extends through each of the shield panels at least twice.

19. A protective shield for a vehicle, the protective shield comprising:
   a plurality of shield panels configured to shield particular areas around a periphery of a vehicle from damage; and
   a connecting member that connects the plurality of shield panels, wherein the connecting member is threaded through each of the plurality of shield panels such that the plurality of shield panels are individually adjustable along a length of the connecting member, and wherein the plurality of shield panels are movable along the length of the connecting member to shield the particular areas anywhere along the periphery of the vehicle.

* * * * *